United States Patent
Bono (10) Patent No.: US 9,898,482 B1
(45) Date of Patent: Feb. 20, 2018

(54) MANAGING STREAM CONNECTIONS IN STORAGE SYSTEMS

(71) Applicant: EMC Corporation, Hopkinton, MA (US)

(72) Inventor: Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 721 days.

(21) Appl. No.: 14/141,869

(22) Filed: Dec. 27, 2013

(51) Int. Cl.
*G06F 15/16* (2006.01)
*G06F 17/30* (2006.01)

(52) U.S. Cl.
CPC .................. *G06F 17/30194* (2013.01)

(58) Field of Classification Search
CPC .................................. G06F 17/30194
USPC ......................................... 709/235
See application file for complete search history.

(56) References Cited

U.S. PATENT DOCUMENTS

| | | | | |
|---|---|---|---|---|
| 6,047,323 A * | 4/2000 | Krause | ................ | G06F 9/4426 709/201 |
| 7,296,288 B1 * | 11/2007 | Hill | ................ | H04L 41/0896 713/194 |
| 7,545,748 B1 * | 6/2009 | Riddle | ................ | H04L 43/08 370/230 |
| 8,549,173 B1 * | 10/2013 | Wu | ................ | G06F 9/5016 370/235.1 |
| 9,130,864 B2 * | 9/2015 | Keith | ................ | H04L 47/2433 |
| 2003/0046396 A1 * | 3/2003 | Richter | ................ | G06F 9/505 709/226 |
| 2003/0055327 A1 * | 3/2003 | Shaw | ................ | H04L 29/06 600/407 |
| 2004/0260829 A1 * | 12/2004 | Husak | ................ | H04L 47/15 709/232 |
| 2007/0180533 A1 * | 8/2007 | Ramaiah | ................ | H04L 45/54 726/26 |
| 2009/0240874 A1 * | 9/2009 | Pong | ................ | G06F 12/0223 711/105 |
| 2009/0276588 A1 * | 11/2009 | Murase | ................ | G06F 3/0608 711/160 |
| 2010/0131668 A1 * | 5/2010 | Kamath | ................ | H04L 47/32 709/233 |
| 2011/0153724 A1 * | 6/2011 | Raja | ................ | H04L 67/325 709/203 |
| 2011/0214157 A1 * | 9/2011 | Korsunsky | ................ | G06F 21/55 726/1 |
| 2013/0282766 A1 * | 10/2013 | Goyal | ................ | H04L 67/327 707/803 |
| 2014/0269545 A1 * | 9/2014 | Galeev | ................ | H04L 5/0026 370/329 |
| 2016/0099963 A1 * | 4/2016 | Mahaffey | ................ | H04L 63/1433 726/25 |

* cited by examiner

*Primary Examiner* — Kevin Bates
*Assistant Examiner* — Ronak Patel
(74) *Attorney, Agent, or Firm* — Deepika Bhayana; Krishnendu Gupta (57) ABSTRACT

A method is used in managing stream connections in storage systems. A set of criteria is evaluated for managing flow control characteristics of a stream connection in a storage system. The flow control characteristics indicates the rate at which requests are processed by the stream connection. Based on the evaluation, management of the flow control characteristics is affected.

20 Claims, 5 Drawing Sheets

MANAGING STREAM CONNECTIONS IN STORAGE SYSTEMS

BACKGROUND

Technical Field

This application relates to managing stream connections in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its communications system.

A data storage system such as a network file server may support any number of client-server communication protocols, such as the User Datagram Protocol (UDP) and the Transmission Control Protocol (TCP). UDP is a connectionless protocol. Generally, there is one pipe or stream of messages (e.g., requests) over a network link from a number of clients to one or more servers under UDP protocol. The messages under such communications protocol get mixed together during transmission in a pipe. TCP is a connection oriented protocol. Generally, each client is assigned a separate pipe to a respective server under TCP protocol. In case of TCP protocol, threads are assigned to respective pipes, and the pipes are assigned to respective clients. Therefore, under such communications protocol, the threads remain connected to the respective clients.

SUMMARY OF THE INVENTION

A method is used in managing stream connections in storage systems. A set of criteria is evaluated for managing flow control characteristics of a stream connection in a storage system. The flow control characteristics indicates the rate at which requests are processed by the stream connection. Based on the evaluation, management of the flow control characteristics is affected.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing stream connections in storage systems, which technique may be used to provide, among other things, evaluating a set of criteria for managing flow control characteristics of a stream connection in a storage system, where the flow control characteristics indicates the rate at which requests are processed by the stream connection, and based on the evaluation, affecting management of the flow control characteristics.

Typically, a client communicates with a storage system using a network protocol which is used to transfer data between the client and the storage system. Data transfers may be message- or packet-base, and each layer of a network protocol performs some processing on the packet and passes it to the next layer. The layers of a network protocol may include interchangeable parts, and a specific module may be combined with different protocols in other layers of the network protocol. A network protocol may include a streams component which provides a message-based interface that includes facilities for buffer management, flow control, and priority-based scheduling. The streams component supports layered protocol by stacking protocol modules to function as a pipeline.

Thus, a stream is a full-duplex processing and data transfer path between a driver in kernel space and a process in user space. Thus, a stream provides a connection between a process and a device or another process. A stream includes multiple processing modules connected to each other. A module in a stream communicates by passing messages to their neighboring module. A module provides at least one entry point to each neighbor such as a routine that accepts messages. At the end of a stream, closest to a process is a set of routines that provide an interface to the rest of a storage system. A write request and an I/O control request from a user (e.g., a client) is transformed into messages which are sent along a stream such that a read side of the stream receives data from the stream and pass it to the user. At the other end of a stream is either a device driver module, or another process. In such a case, data arriving from the stream at a driver module is transmitted to the device, and data and state transitions detected by the device are composed into messages and sent into the stream towards the user process. Pipes, which are streams connecting processes, are bidirectional in nature. A writer at either end of a stream generates stream messages that are picked up by a reader at the other end of the stream. Further, a stream module is a part of an operating system kernel of a system.

Streams are also described Chapter 17 of "UNIX Internals The New Frontiers" by Uresh Vahalia, ISBN 0-13-101908-2, Prentice Hall, Upper Saddle River, N.J.-07458, which is incorporated herein by reference.

Generally, a data storage system (e.g., a file server) supports file system protocols such as Network File System (NFS, version 2, 3, 4 and other versions) (and/or other access protocols). NFS is a well-known IETF file access protocol standard (RFC 1094, Sun Microsystems, Inc., "NFS: Network File System Protocol Specification," Mar. 1, 1989). NFS provides basic file access operations for network clients. Such basic file access operations include opening a file, reading a file, writing to a file, and closing a file.

Typically a client may be connected to a file server based on different configurations and use cases. One basic use case is when a user's laptop is connected to a file server and the user access files organized on the file server using a file system access protocol. Another use case is when a set of virtualization servers (e.g., VMware® ESX server) in communication with a file server provides access to data by using file system access protocols (e.g., NFS). Thus, in such a virtualization use case, a large number of users may communicate with a virtual server even though only few TCP connections exists between the virtual server and a file server.

Conventionally, a defensive mechanism has been introduced in stream head layer of streams module. In such a conventional system, the defensive mechanism attempts to avoid creating severe impact on NFS file services by clients in order to avoid an erroneous situation (e.g., Denial of Service (DOS)). In such a conventional system, the defensive mechanism manages NFS requests in such a way that the number of NFS requests being executed by threads is not more than the number of requests that can be replied to at any given time in order to avoid suspending processing of NFS requests. Thus, in such a conventional system, a fixed threshold value determines how many NFS requests may be executed on a system for a specific stream (e.g., NFS stream) or TCP connection at any given time. Further, in such a conventional system, the threshold value is a fixed static value (e.g., 64) which is difficult or impossible to change. Conventionally, the pre-determined threshold value may be sufficient for a traditional use case in which a client does not send a large number of requests over a TCP connection and may work effectively in such a use case. However, in such a conventional system, in case of a virtual environment where a large number of requests may be received from clients of a virtual server over a small number of TCP connections established between the virtual server and a system, the pre-determined threshold value may not be sufficient which may cause suspension of NFS service when the system is unable to process replies for the large number of requests. Further, in such a conventional system, the pre-determined threshold value for a stream connection is static in nature as the value is built into a system software which does not provide any flexibility in changing the value for managing NFS requests under different use case scenarios. Consequently, in such a conventional system, it is difficult or impossible to change the threshold value when a system is deployed in different use case scenarios (e.g., home directory use, a virtualized environment). Further, in such a conventional system, it is difficult or impossible to predict the right value for a threshold and change the threshold to that right value without creating a denial of NFS service error situation. Consequently, in such a conventional system, performance of clients is impacted when NFS requests are not managed efficiently because of inability to change a fixed pre-determined threshold value based on condition of a system.

By contrast, in at least some implementations in accordance with the technique as described herein, the use of managing stream connections in storage systems technique enables a data storage system to dynamically and adaptively change the threshold value for a stream connection based on evaluation of a set of criteria such as the number of established NFS connections in the data storage system, state of the data storage system, the total number of NFS replies pending for NFS connections in the data storage system, and the type of client in communication with the data storage system. Thus, in at least one embodiment of the current technique, the threshold becomes an attribute of a stream connection and an initial value of the threshold is set to a specific number which may dynamically change based on evaluation of a set of criteria. Thus, in at least one embodiment of the current technique, in such a system, the threshold value may either increase or decrease from its initial value based on a set of factors such as the number of NFS connections and the maximum number of NFS replies pending for a stream. Thus, in such a system, the threshold for a stream connection adaptively changes based on configuration of a system and a use case based on which the system has been deployed thereby increasing performance of the system and performance of clients in communication with the system. Thus, in at least one embodiment of the current technique, the threshold value for a stream connection changes dynamically based on what else has been occurring in a system with respect a set of factors such as the total number of TCP connections established in the system, how many messages and/or data may have been pending across the total number of TCP connections, statistics regarding how each of the TCP connections use their respective threshold value, and how respective threshold value is adjusted to provide a higher value to connections that keep exceeding their respective threshold value.

In at least some implementations in accordance with the current technique as described herein, the use of the managing stream connections in storage systems technique can provide one or more of the following advantages: improving memory and storage utilization by adaptively changing a threshold value for a stream, improving I/O performance by efficiently managing pending NFS requests and replies, improving performance of a client system by efficiently processing requests received from the client, and improving response time of applications by efficiently managing requests received from the applications.

Figure 1:
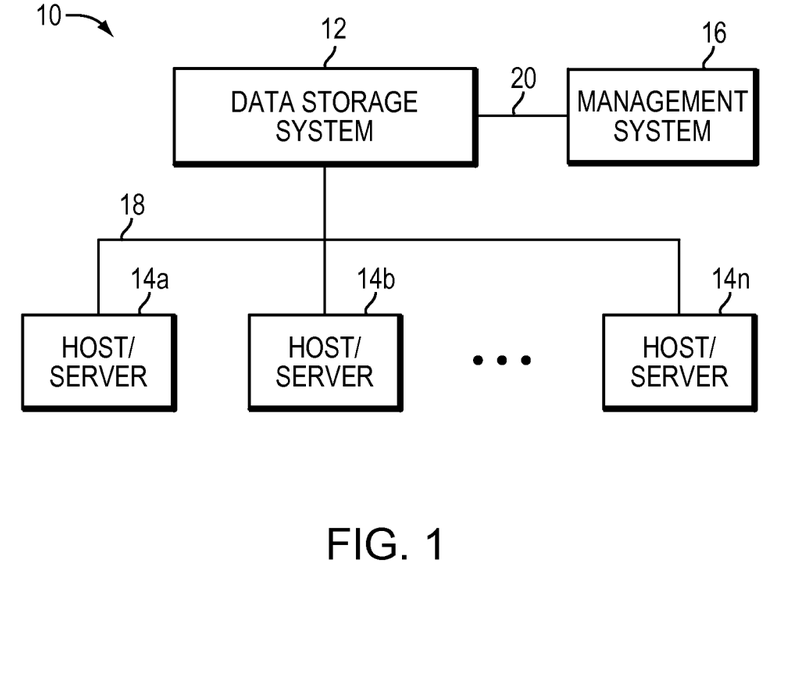
FIGS. 1-3 are examples of an embodiment of a computer system that may utilize the techniques described herein.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
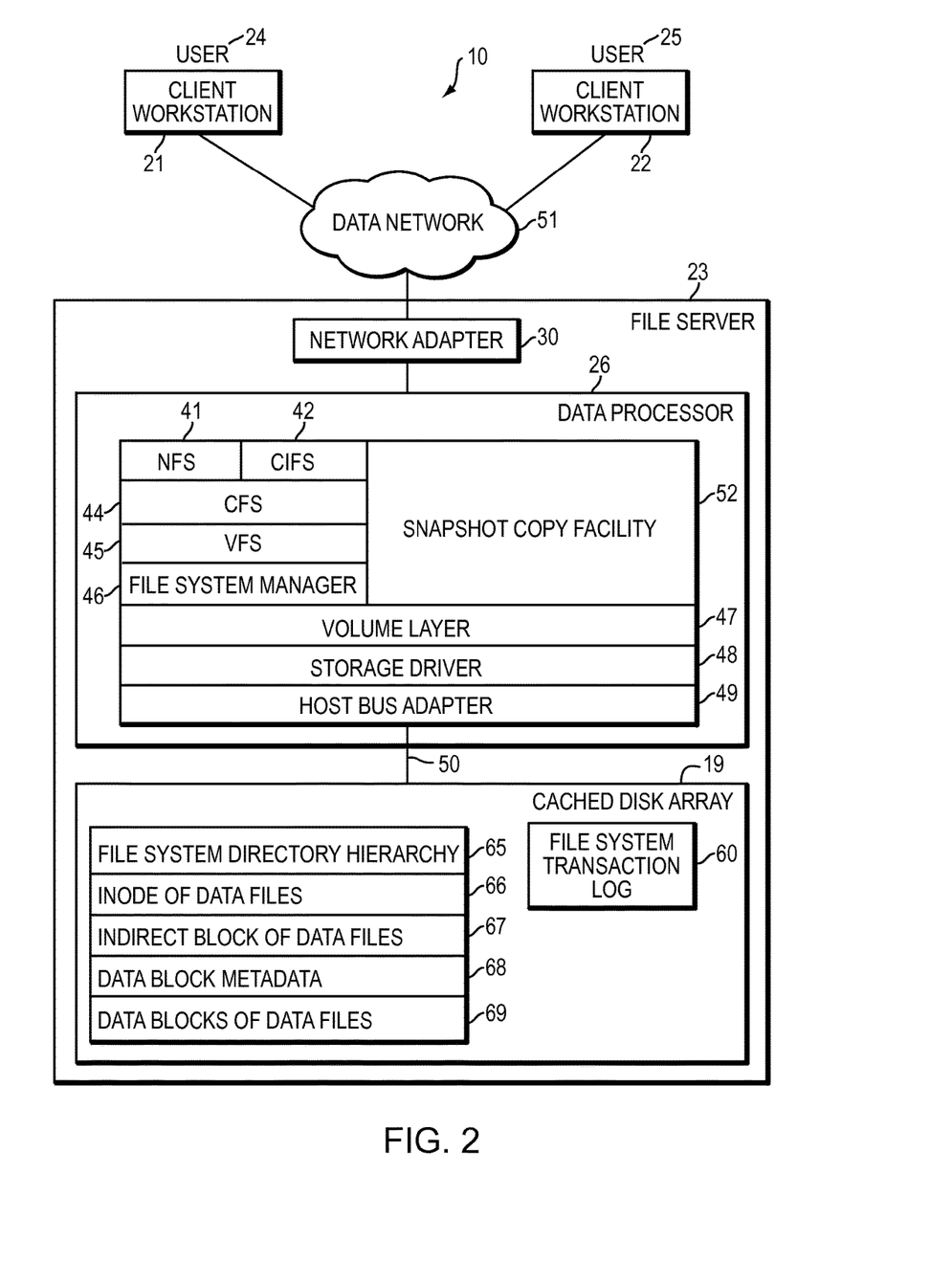

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. In at least one embodiment of the current technique, global data cache 126 stores data of a file of a file system in a volatile memory of data storage system 10.

Figure 3:
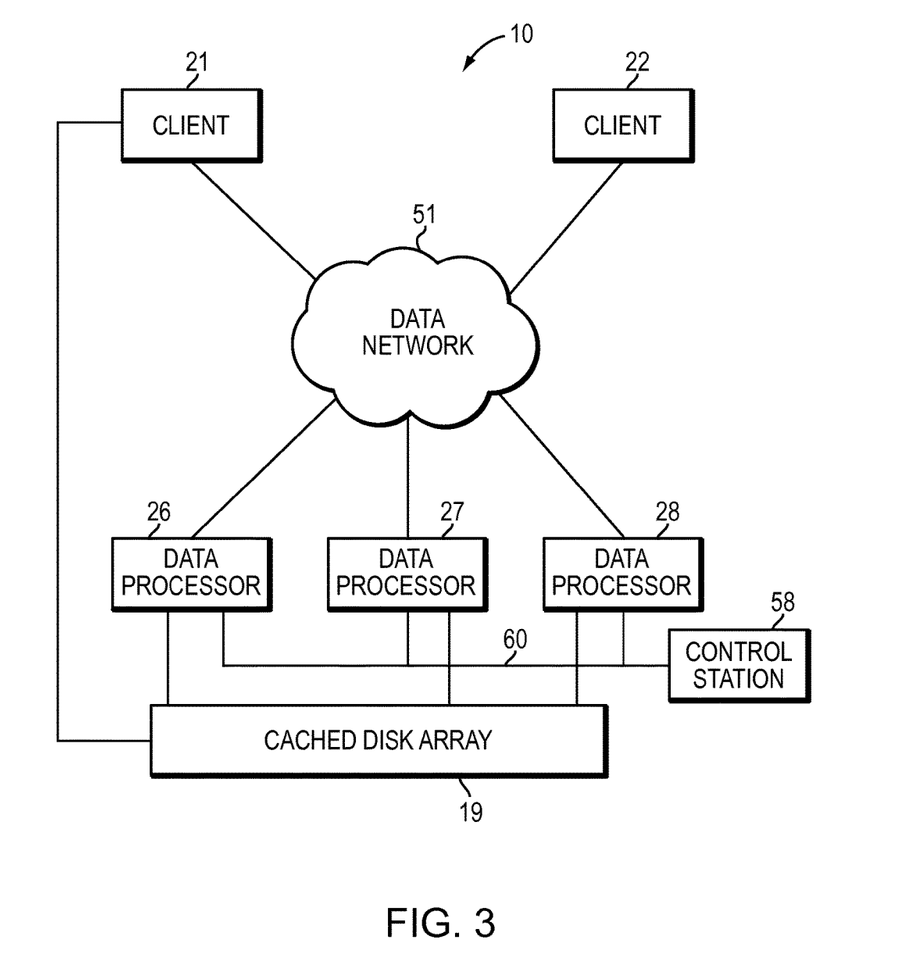

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
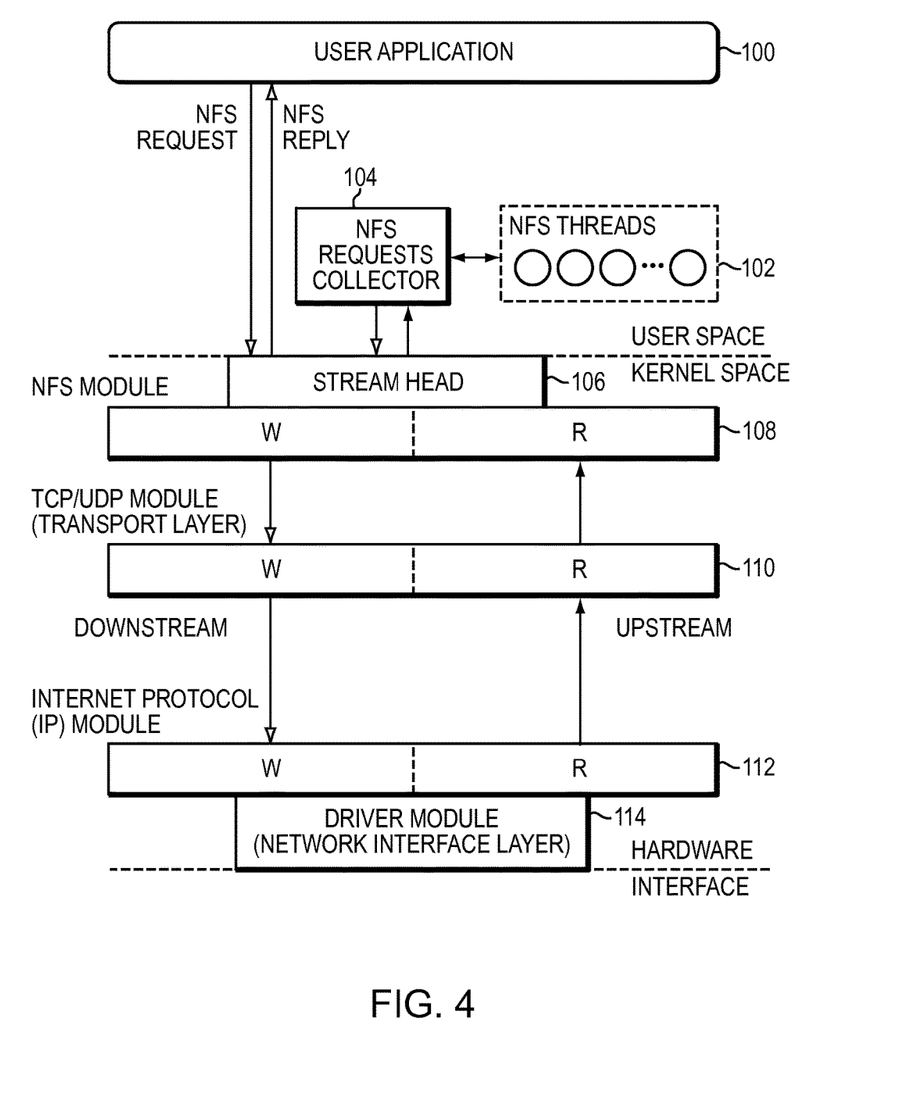
FIG. 4 is a diagram illustrating in more detail components that may be used in connection with techniques herein.

Referring to FIG. 4, shown is a more detailed representation of components that may be included in an embodiment using the techniques herein. With reference also to FIGS. 1-3, a group of software modules providing communication between common file system 44 and network 19 includes file access protocols and a network server interface using communication stacks 108, 110, 112 and network link drivers 114. The file access protocols include a set of industry standard network server protocols such as NFS, CIFS. Other file access protocols compatible with the network 25 could also be used. The communication stacks 108, 110, 112 provide network access and connectivity for the data transmitted to the file access protocol layer from the network link drivers 114. There may be multiple concurrent instances of the file access protocols, communication stacks 108, 110, 112, and drivers 114.

As described above, the network file server 23 of FIG. 2 supports a number of file access protocols. These file access protocols may use a number of communication protocols, including the User Datagram Protocol (UDP) and the Transmission Control Protocol (TCP). Further, the Network File System (NFS) provides access to files via standard UNIX system calls. This allows any program to access files across a network. NFS may use either UDP or TCP transport layer. Generally, UDP is a connectionless protocol. There is one fast pipe conveying messages (e.g., requests) from a number of clients to a server. As used herein, the term "pipe" denotes generally a network link or message stream received by the file server 23 from one or more network clients. The messages may get mixed together during transmission in the pipe. Further, TCP is a connection oriented protocol. Each of the clients is assigned a separate pipe for sending messages to the server 23.

In at least one embodiment of the current technique, user applications programs 100 send messages (streams of data) to the Internet Transport-Level Protocols which include UDP and TCP 110. These protocols receive data from the applications 100, divide the data into packets, add a transport header, and then pass the packets along to the next protocol layer, the Internet Protocol ("IP") layer 112. The IP layer 112 encloses the packet in an IP datagram, adds the datagram header, decides where to send the datagram (either directly to a destination or else to a gateway), and passes the datagram on to the Network Interface layer 114. The Network Interface layer 114 accepts IP datagrams and transmits them as frames over a specific network hardware. Frames received by a network go through the protocol layers in reverse. Each layer strips off the corresponding header information from data until the data is back at the application level 100. For example, frames are received by the Network Interface layer 114 (for example, an Ethernet adapter), which strips off physical layer header and sends datagram to the IP layer 112. In the IP layer 112, the IP layer strips off the IP header and sends the packet to the Transport layer 110. The Transport layer 110 strips off the TCP or UDP header and sends the data up to the Application layer 100.

Referring back to FIG. 4, In at least one embodiment of the current technique, FIG. 4 describes a stream which resides in a kernel space. A stream includes a stream head 106, a driver module 114, and zero or more optional modules between the stream head 106 and driver module 114. The stream head 106 interfaces with a user level and allows user applications 100 to access the stream through system call interfaces. The driver module 114 communicates with a device itself. Each module 106-114 includes a pair of queues—a read queue and a write queue. A stream transfers data by putting it in messages. The write queues send messages downstream from an application 100 to a driver 114. The read queues pass messages upstream, from the driver 114 to the application 100. Although most messages originate at the stream head 106 or driver 114, intermediate modules 108-112 may also generate messages and pass them up or down the stream. Further, each queue may communicate with the next queue in the stream.

Thus, in at least one embodiment of the current technique, a stream performs I/O by passing messages from one queue to another. A user process may write to a device using a write system call. In such a case, the stream head 106 allocates a message and copies the data into it. The stream head 106 then sends the message downstream to the next queue, and eventually the data reaches the driver 114. Data associated with a reply from the device arrives asynchronously, and the driver 114 sends the data upstream toward the stream head 106. The user process receives the data through a read call. If there is no data available at the stream head 106, the process blocks.

Further, in at least one embodiment of the current technique, a collector queue (e.g., NFS requests collector 104) is used in file server 23 in order to gather messages from stream head 106. As shown in FIG. 4, a set of NFS threads 102 of a server 23 receive messages directly from the collector queue 104 rather than individual pipes or streams conveying messages from the user applications 100 executing on clients. Messages may be received from pipes or streams by network link drivers 114 and placed in the collector queue 104. In the collector queue 104, messages from a pipe for a connection oriented process such as TCP are mixed and interleaved with messages for other connection oriented and connectionless processes. However, the collector queue 104 maintains the ordering of the messages in each pipe. For example, messages in the collector queue 104 may be serviced on a first-in, first-out basis. Any idle thread from the set of NFS threads 102 may pick up a message from the collector queue 104 and may become an active thread which then processes and responds to the message. The threads 102 may be components of a software implementing file access protocols (e.g., NFS). The collector queue 104 keeps track of which pipe each message came from, and whether the reply of the server to each message is directed to the same pipe from which the message came from. Therefore, the collector queue 104 ensures balance and efficiency. After a message is added to the collector queue 104, a determination is made as to whether there is an idle thread for processing the message and whether the idle thread can process the message.

Further, in at least one embodiment of the current technique, the collector queue 104 may help support flow control mechanism. A flow control mechanism for a stream defines a threshold which controls the total amount of data that may be queued in the stream. Further, messages from a client may arrive on read side (also referred to herein as a read queue) of a stream, processed and replies may be sent on write side (also referred to herein as a write queue) of the stream. A message is pushed upstream as long as flow of stream messages are accepted by communication modules 106-114. Each communication module waits to receive acceptance from the next module and may suspend sending a request until an acceptance notification is received. When a request reaches the stream head 106, request collector queue 104 is notified that a message has been queued and is ready for processing. A thread from a set of threads 102 may remove the message from the collector queue 104, process the message and may respond by writing a reply to a write queue of the stream.

In at least one embodiment of the current technique, a threshold value may be used for managing flow control in a stream connection such that the threshold value manages the number of requests processed by the stream connection by tracking the number of requests processed by NFS threads 102. Further, when a thread 102 removes a message for processing from requests collector queue 104, a counter which tracks the number of pending requests is increased by one. Further, when the message is processed by a thread and a reply is sent to a client, the counter is decremented by one. When the counter reaches the threshold value, no additional message is removed from requests collector 104 for processing. Further, when the counter is below the threshold value, the write stream queue functions asynchronously by queuing each reply and goes ahead to process the next request. However, when the counter reaches the threshold value, the write stream queue becomes synchronous and stops queuing additional messages. Thus, the counter for tracking the number of pending requests may reach the threshold value when one side of a stream (e.g., a write queue) continues sending messages but another side of the stream (e.g., a read queue) is unable to process the incoming messages. In such a scenario, the write queue becomes synchronous and is unable to accept additional messages for processing until the counter for tracking the number of pending requests goes below the threshold value. Thus, in such a case, a client may receive an error message (such as NFS not responding) and NFS service may stop responding all together.

Conventionally, when the number of request pending for processing reaches the pre-determined threshold value, the write queue becomes dependent on the read queue in such a way that a set of threads may be idle and unable to process any messages until the number of pending requests goes below the pre-determined threshold value. Further, in such a conventional system, the pre-determined threshold value is set to a low number (e.g., 64) because increasing the threshold value to a large number may consume a large amount of memory when a large number of requests are created and added to requests collector 104. In such a conventional system, when a large amount of memory is consumed due to a high threshold value, a file server may become non responsive as the file server may consume all of most of its available memory.

By contrast, in at least some implementations in accordance with the technique as described herein, write and read queues of a stream work efficiently in conjunction with each other by dynamically changing the threshold value in different use case scenarios such as a virtualization use case where a large number of requests may be received by a file server through a small number of TCP connections established between a virtual server and the file server. In such a case, in at least one embodiment of the current technique, the threshold value for a stream connection is dynamically changed based on a set of criteria such as the number of requests received by a file server, the state of a processor of the file server, the use case for which the processor of the file server is configured for. Thus, in contrast to a conventional pre-determined static threshold value, in at least one embodiment of the current technique, a floating threshold is used which changes its value based on an understanding of how many NFS replies are outstanding in an overall system. In at least one embodiment of the current technique, a set of factors that may be evaluated for changing the threshold value of a stream may include the number of TCP connections established in a file server, the amount of memory in use in the file server, the total number of outstanding NFS requests at a given time for each processor of the file server and for each stream in the file server, and the number of NFS replies pending across all TCP connections. Further, if a processor of a file server is configured for more than one use case, IP address of the processor may be evaluated to determine the type of client (e.g., traditional or virtual client) connected to the processor and based on the evaluation, the threshold value for a stream may be changed. For example, a virtual client may be assigned a higher threshold value than a traditional client. Further, in at least one embodiment of the current technique, a system watchdog mechanism may monitor traffic on each TCP connections in a file server and adjust the threshold value based on the traffic on the TCP connections. Further, statistics may be maintained and provided to the streams watchdog mechanism which tracks how many time the number of pending NFS requests have exceeded a threshold value. Thus, the statistical information is used to dynamically adjust the threshold value. Further, in at least one embodiment of the current technique, each stream connection may have a different threshold value based on traffic on that stream connection. Thus, in at least one embodiment of the current technique, conventional defensive mechanism for management of stream connections has been improved in such a way that performance of a system is not impacted by a large number of incoming NFS requests, memory of a file server is utilized efficiently, and the threshold value is dynamically changed based on evaluation of a set of criteria.

Figure 5:
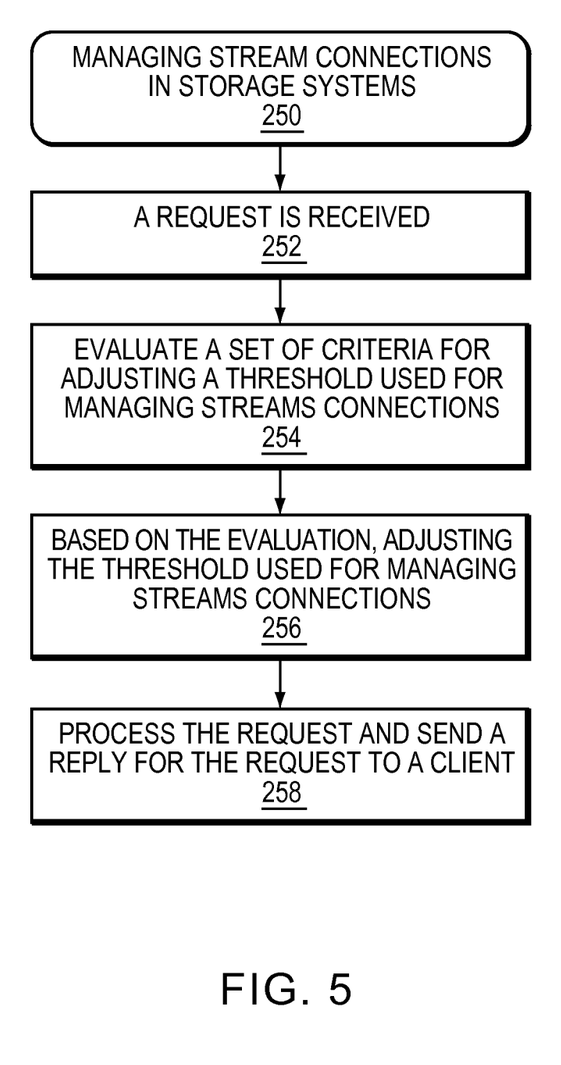
FIG. 5 is a flow diagram illustrating processes that may be used in connection with techniques herein.

Referring to FIG. 5, shown is a flow diagram illustrating the method of managing stream connections in storage systems. With reference also to FIGS. 1-4, in at least one embodiment of the current technique, one or more stream connections are managed in a storage system (step 250). A request (e.g., NFS request) is received from a client on a stream connection (step 252). A set of criteria are evaluated in order to determine whether a threshold value for the stream connection is required to be adjusted (step 254). Based on the evaluation, the threshold is adjusted to the new value which help efficiently manage the stream connection (step 256). The request is processed and a reply for the request is sent to the client (step 258).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing stream connections in storage systems, the method comprising:
receiving a request from a client in communication with a storage system, wherein the client communicates with the storage system using a network protocol for transferring data between the client and the storage system, wherein the request is received on a stream connection in the storage system, wherein the storage system manages one or more stream connections, wherein a stream connection provides a path for transferring the data;
evaluating a set of criteria for managing flow control characteristics of the stream connection in the storage system, wherein the flow control characteristics for the stream connection are managed by a threshold value that manages the rate at which requests are processed by the stream connection, wherein the set of criteria includes a state of the storage system, a number of requests received on the stream connection, a number of responses pending on the stream connection, a type of the client, and use case configuration of the storage system, wherein the use case configuration of the storage system indicates a configuration based on which the client has been connected to the storage system; and
based on the evaluation, determining whether to adjust the threshold value to another value, wherein the threshold value is adaptively changed based on the evaluation of the set of criteria, wherein changing the threshold value changes the rate at which requests are processed by the stream connection.

2. The method of claim 1, wherein the flow control characteristics includes a threshold value, wherein the threshold value indicates the number of requests processed by a stream connection.

3. The method of claim 2, further comprising:
changing the threshold value based on evaluation of the set of criteria.

4. The method of claim 1, wherein the set of criteria includes the number of Network File System (NFS) connections established in the storage system, the number of messages associated with the NFS connections, and the type of client connected to the storage system.

5. The method of claim 1, further comprising:
based on a threshold value, adding a request to a requests collector queue; and based on the threshold value, removing the request for processing from the requests collector queue.

6. The method of claim 1, further comprising:
incrementing a counter value upon processing of a request in the stream connection; and
decrementing the counter value upon processing of a reply for the request in the stream connection.

7. The method of claim 1, wherein the stream connection is based on Transmission Control Protocol (TCP) communications protocol.

8. The method of claim 1, wherein the request includes a Network File System (NFS) request.

9. The method of claim 1, wherein the stream connection includes a set of communications modules.

10. The method of claim 1, wherein the stream connection includes a write queue and a read queue, wherein the write queue transfers a message from a client to the storage system and the read queue transfers a message from the storage system to the client.

11. A system for use in managing stream connections in storage systems, the system comprising a processor comprised to:
receive a request from a client in communication with a storage system, wherein the client communicates with the storage system using a network protocol for transferring data between the client and the storage system, wherein the request is received on a stream connection in the storage system, wherein the storage system manages one or more stream connections, wherein a stream connection provides a path for transferring the data;
evaluate a set of criteria for managing flow control characteristics of the stream connection in the storage system, wherein the flow control characteristics for the stream connection are managed by a threshold value that manages the rate at which requests are processed by the stream connection, wherein the set of criteria includes a state of the storage system, a number of requests received on the stream connection, a number of responses pending on the stream connection, a type of the client, and use case configuration of the storage system, wherein the use case configuration of the storage system indicates a configuration based on which the client has been connected to the storage system; and
determine, based on the evaluation, whether to adjust the threshold value to another value, wherein the threshold value is adaptively changed based on the evaluation of the set of criteria, wherein changing the threshold value changes the rate at which requests are processed by the stream connection.

12. The system of claim 11, wherein the flow control characteristics includes a threshold value, wherein the threshold value indicates the number of requests processed by a stream connection.

13. The system of claim 12, further comprising:
change the threshold value based on evaluation of the set of criteria.

14. The system of claim 11, wherein the set of criteria includes the number of Network File System (NFS) connections established in the storage system, the number of messages associated with the NFS connections, and the type of client connected to the storage system.

15. The system of claim 11, further comprising:
add, based on a threshold value, a request to a requests collector queue; and
remove, based on the threshold value, the request for processing from the requests collector queue.

16. The system of claim 11, further comprising:
increment a counter value upon processing of a request in the stream connection; and
decrement the counter value upon processing of a reply for the request in the stream connection.

17. The system of claim 11, wherein the stream connection is based on Transmission Control Protocol (TCP) communications protocol.

18. The system of claim 11, wherein the request includes a Network File System (NFS) request.

19. The system of claim 11, wherein the stream connection includes a set of communications modules.

20. The system of claim 11, wherein the stream connection includes a write queue and a read queue, wherein the write queue transfers a message from a client to the storage system and the read queue transfers a message from the storage system to the client.

* * * * *